(12) United States Patent
Leather (10) Patent No.: US 7,075,542 B1
(45) Date of Patent: Jul. 11, 2006

(54) SELECTABLE MULTI-PERFORMANCE CONFIGURATION

(75) Inventor: Mark M. Leather, Saratoga, CA (US)

(73) Assignee: ATI Technologies Inc., Markham (CA)

( * ) Notice: Subject to any disclaimer, the term of this patent is extended or adjusted under 35 U.S.C. 154(b) by 0 days.

(21) Appl. No.: 10/731,752

(22) Filed: Dec. 8, 2003

Related U.S. Application Data (63) Continuation of application No. 10/712,578, filed on Nov. 12, 2003, now abandoned.

(60) Provisional application No. 60/425,592, filed on Nov. 12, 2002.

(51) Int. Cl.
*G06F 15/80* (2006.01)
*G06T 1/20* (2006.01)

(52) U.S. Cl. .................................. 345/506; 345/505

(58) Field of Classification Search ............... 345/501, 345/502, 505, 506, 582, 426, 552, 589; 358/1.1, 358/1.15
See application file for complete search history.

(56) References Cited

U.S. PATENT DOCUMENTS

| | | | |
|---|---|---|---|
| 6,323,860 B1 * | 11/2001 | Zhu et al. | 345/427 |
| 6,373,585 B1 * | 4/2002 | Mastie et al. | 358/1.15 |
| 6,650,327 B1 * | 11/2003 | Airey et al. | 345/422 |
| 6,683,614 B1 * | 1/2004 | Walls et al. | 345/506 |
| 6,714,200 B1 * | 3/2004 | Talnykin et al. | 345/473 |
| 6,919,896 B1 * | 7/2005 | Sasaki et al. | 345/505 |
| 2004/0008204 A1 * | 1/2004 | Deering et al. | 345/539 |

* cited by examiner

*Primary Examiner*—Kee M. Tung
(74) *Attorney, Agent, or Firm*—Brown Raysman Millstein Felder & Steiner LLP (57) ABSTRACT

The present invention relates to a selectable multi-performance configuration. Instead of the traditional methods of producing separate high-end and low-end graphics chips, the present invention produces processing systems in a single unit. The single unit is readily and functionally partitionable. Each partition is capable of independent operation. By using all of the partitions a high-end graphics processing system may be simulated and tested. By using a subset of the partitions, a low-end graphics processing system may be simulated on the same system without the added cost of re-design of either hardware or software.

23 Claims, 8 Drawing Sheets

SELECTABLE MULTI-PERFORMANCE CONFIGURATION

RELATED APPLICATION

This application is a continuation application of U.S. patent application Ser. No. 10/712,578 filed Nov. 12, 2003 now abandoned, which claims priority to U.S. Provisional Patent Application No. 60/425,592 filed Nov. 12, 2002.

BACKGROUND OF THE INVENTION

1. Field of the Invention

The present invention relates computer graphics. More specifically, one or more embodiments of the present invention relate to a graphics hardware configuration that offers selectable multi-performance.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computer systems are often used to generate and display graphics on an output device such as a monitor. Generating and displaying high-quality graphics is a computationally intensive undertaking. As such, it requires specialized graphics processing hardware or "chips" in the computer system to quickly and efficiently perform the necessary processing. Typically, the specialized chips fall into the general categories of high-end chips and low-end chips. High-end systems are more expensive and are designed to provide the highest level of performance for the most rigorous and detailed graphics applications. Low-end systems are less expensive and are more economical where the graphics application is less computationally intensive and more simple.

One problem associated with high-end and low-end chips is that they are typically designed, tested, and built as separate products. Designing, testing, and building separate high-end and low-end products requires a manufacturer to produce two different designs for the hardware associated with the graphics system. Furthermore, the two different designs must be tested and built as separate projects. This is economically disadvantageous from a manufacturer's point of view. This problem can be better understood by reviewing an example of a graphics systems where this problem arises.

Graphics System

Display images are made up of thousands of tiny dots, where each dot is one of thousands or millions of colors. These dots are known as picture elements, or "pixels". Each pixel has multiple attributes associated with it, including a color and a texture. Each pixel has a color, with the color of each pixel being represented by a number value stored in the computer system. A three dimensional display image, although displayed using a two dimensional array of pixels, may in fact be created by rendering of a plurality of graphical objects.

Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive (color and depth or "Z" data), and a drawing command. The execution of drawing commands to generate a display image is known as graphics processing.

Specialized Graphics Chips

The processes described above in connection with a graphics processing system are computationally intensive. For instance, there may be thousands of pixels on the screen and to draw the entire screen might require multiple calculations to achieve a color for each pixel. Moreover, the screen might be re-drawn many times each second. The computations required by this process would overload the processor and memory of a typical computing system. As such, special graphics processing hardware chips has been developed to assist the typical computer to perform such calculations.

Normally, the specialized graphics processing systems fall into the general categories of high-end systems and low-end systems. High-end systems are more expensive and are designed to provide the highest level of performance for the most rigorous applications. Low-end systems are better suited for graphics applications that are simple or where a user is able to tolerate the tradeoff between performance and cost. Moreover, low-end systems are usually produced in higher volume at lower costs per unit.

One problem associated with high-end and low-end systems is that they are typically designed, tested, and built as separate products. The process yields two different hardware designs for the graphics system. Furthermore, the two different hardware designs must be tested and built as separate projects and computer software and drivers must be developed for both the high-end and low-end systems to get the hardware in both the systems working properly. The software and driver development process for these two systems proceeds separately at great expense. This is economically disadvantageous from a manufacturer's point of view.

SUMMARY OF THE INVENTION

The present invention relates to a selectable multi-performance configuration. According to one or more embodiments, the traditional high-end and low-end graphics processing systems are replaced with a single unit. The single unit is readily and functionally partitionable. Each partition is capable of independent operation. By using all of the partitions a high-end graphics processing system may be simulated and tested. By using a subset of the partitions, a low-end graphics processing system may be simulated on the same system without the added cost of re-design of either hardware or software.

The functionally partitionable design of the present invention greatly reduces the cost associated with designing, testing, and building two distinct types of graphics processing hardware, since a single unit may be built and may be tested with applications designed for both high-end and low-end systems. In one embodiment, the unit comprises four partitions. By using all four partitions, a high end system may be simulated and tested. By instructing the unit to use only one, two, or, three of the partitions, various levels of graphics processing system performances may be simulated as well. In one embodiment, a control mechanism is used to selectively enable and disable the graphics processing pipeline that defines a functional partition. In another embodiment, a mode bit is used to selectably reconfigure the design by instructing the unit which of the functional partitions to use for a given test.

In one embodiment, each pipeline (or functional partition) owns one-half, one-quarter, or some other fractional proportion of the screen pixels based on a repeating screen pattern. Allocation of work between the pipelines depends on whether a given pipeline is activate or disabled and also on how each graphics primitive intersects the screen tile pattern.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to a selectable multi-performance configuration. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Selectable Multi-Performance Configuration

Figure 1:
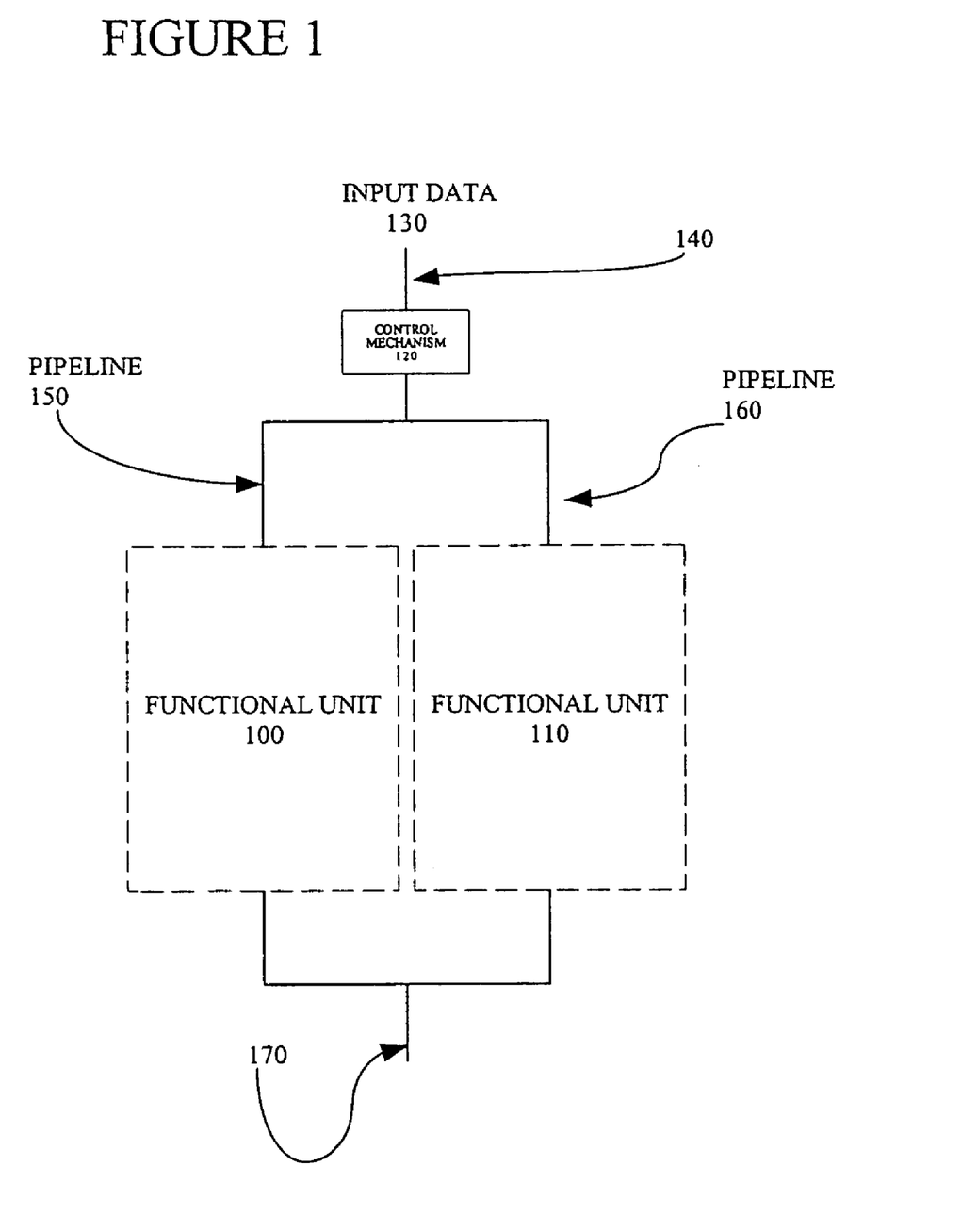
FIG. 1 is a block diagram of a selectable multi-performance configuration according to an embodiment of the present invention.

One embodiment of an architecture used by the present invention is shown in FIG. 1. FIG. 1 contains a first and second functional unit 100 and 110. Each unit is capable of acting as a graphics processing system, such as a rasterizer known to those skilled in the art. A control mechanism 120 is used to instruct either the first functional unit 100 or the second functional unit 110 (or both) to operate. In operation, input data 130 travels along input line 140. The data may travel across pipeline 150 or pipeline 160 (or both) depending on the state of the control mechanism 120. Graphics processing computational activities take place within blocks 100 and 110 and when the computing is complete the results are passed along output line 170 for use on a display screen, for instance. Graphics processing activities might include, for instance, scanning operations, texturing operations, color operations, and pixel shading.

Figure 2:
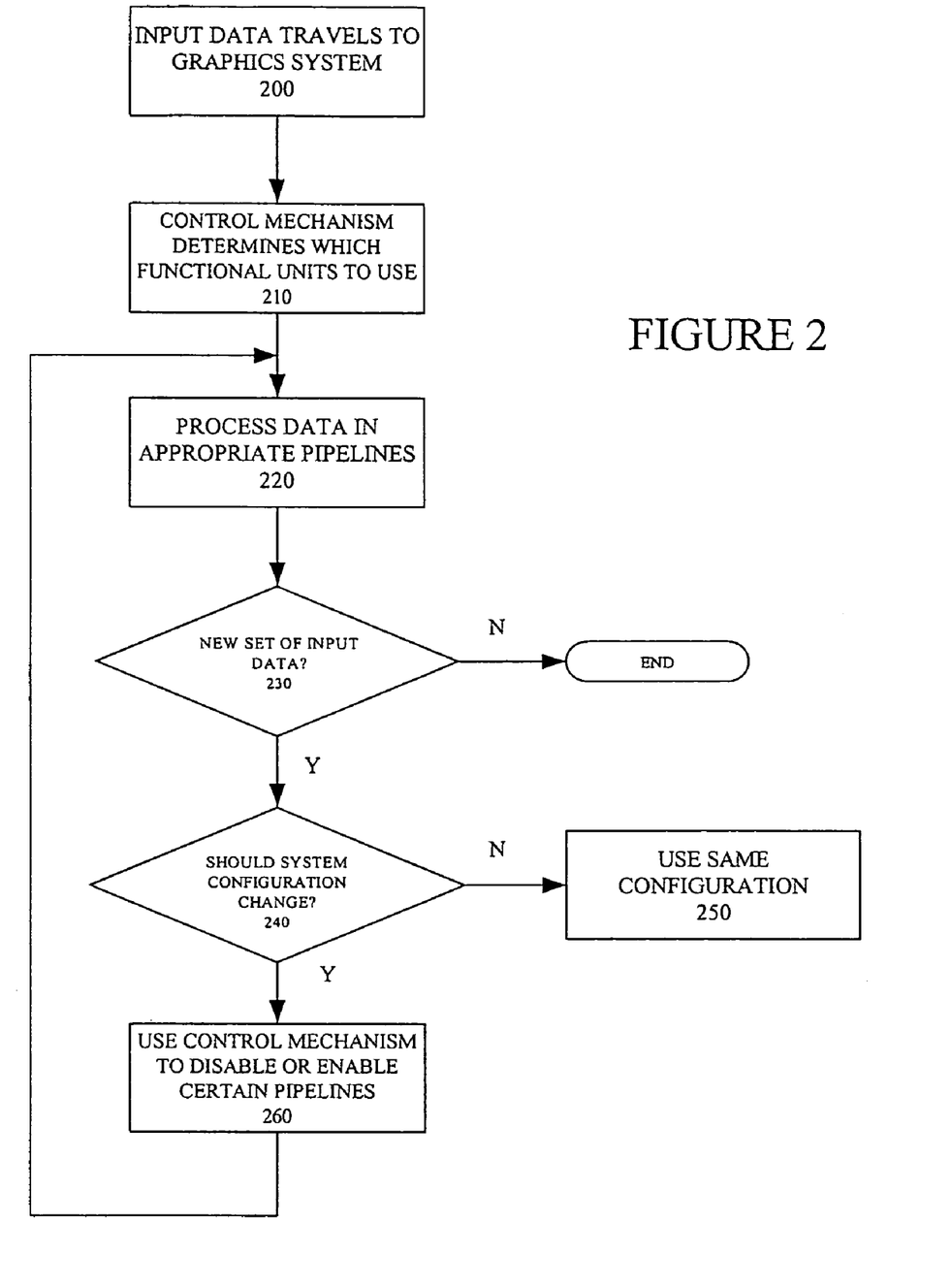
FIG. 2 is a flowchart showing the operation of a selectable multi-performance configuration according to an embodiment of the present invention.

FIG. 2 is a flowchart showing the operation of the architecture shown in FIG. 1. At step 200, input data travels to the graphics system. At step 210, a control mechanism determines which graphics pipelines to use (i.e., many to simulate high-end products or few to simulate low-end products). At step 220 the data is processed in the appropriate pipelines. At step 230, it is determined if a new set of input data is to be used. If not the process is complete. Otherwise, it is determined if the system configuration should change at step 240. If not, the same configuration is used at step 250. Otherwise, the control mechanism is used to activate or disable certain pipelines at step 260 and the process repeats at step 220.

Mode Bit

Figure 3:
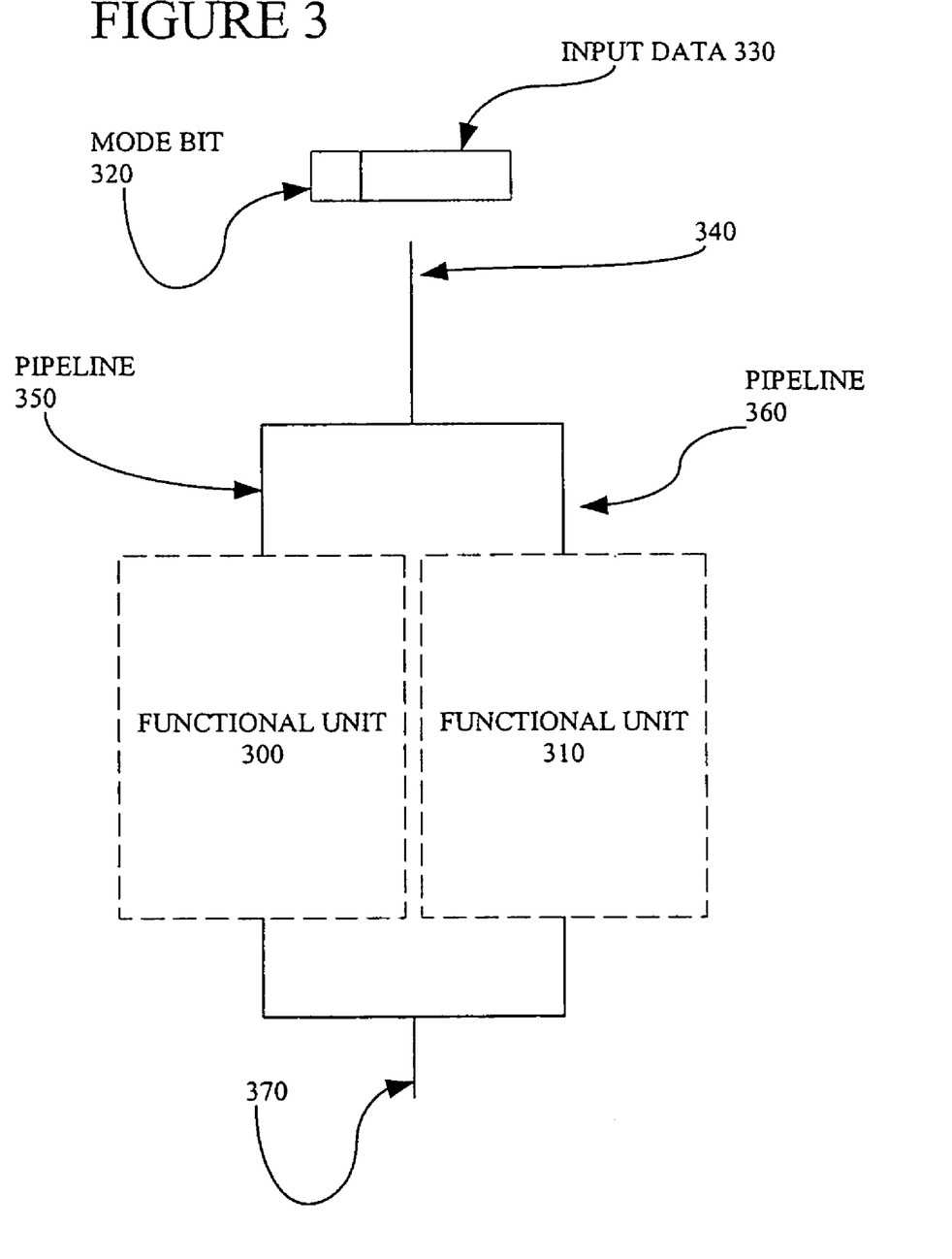
FIG. 3 is a block diagram of a selectable multi-performance configuration according to an embodiment of the present invention.

Another embodiment of an architecture used by the present invention is shown in FIG. 3. FIG. 3 contains a first and second functional unit 300 and 310. Each unit is capable of acting as a graphics processing system known to those skilled in the art. A mode bit 320 is used in conjunction with an input data stream 330. The mode bit 320 instructs the system to use either the first functional unit 300 or the second functional unit 310 (to simulate a low end graphics processing system) or both functional units to simulate a high-end system. In operation, input data 330 and the mode bit 320 travel along input line 340. The data may travel across pipeline 350 or pipeline 360 (or both) depending on the state of the mode bit 320. Graphics processing computational activities take place within blocks 300 and 310, which might include scanning operations, texturing operations, color operations and pixel shading. When the computing is complete, the results are passed along output line 370, which in one embodiment leads to a frame buffer that is used to process the final pixel values that are to be displayed on an output device at the appropriate time.

Figure 4:
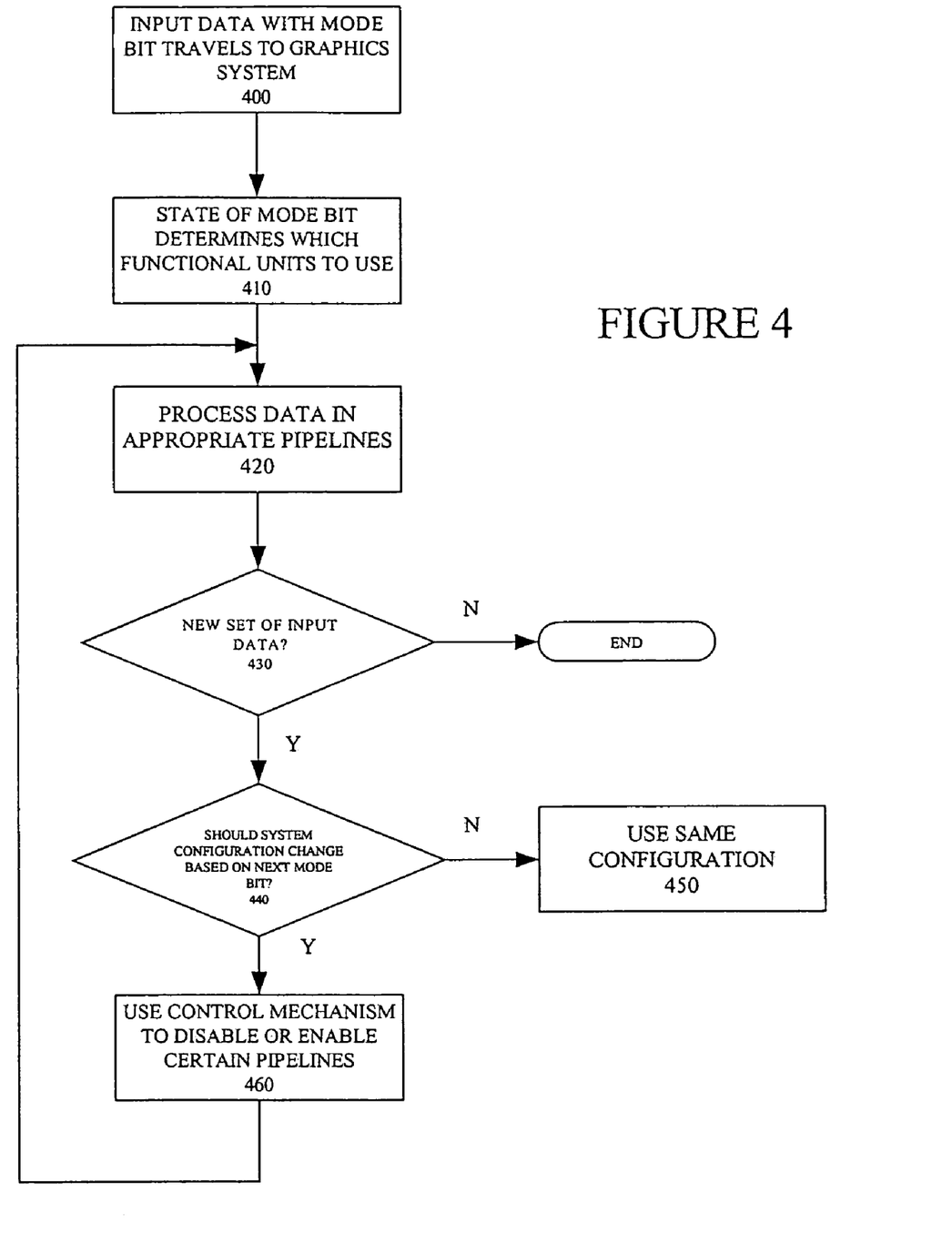
FIG. 4 is a flowchart showing the operation of a selectable multi-performance configuration according to an embodiment of the present invention.

FIG. 4 is a flowchart showing the operation of the architecture shown in FIG. 3. At step 400, input data along with a mode bit travels to the graphics system. At step 410, the state of the mode bit determines which graphics pipelines to use (i.e., many to simulate high-end products or few to simulate low-end products). At step 420, the data is processed in the appropriate pipelines. At step 430, it is determined if a new set of input data is to be used. If not, the process is complete. Otherwise, it is determined if the system configuration should change at step 440 by examining the next mode bit in the input data. If the mode bit is in the same state, the same configuration is used at step 450. Otherwise, certain pipelines are enabled or disabled at step 460 and the process repeats at step 420.

Embodiment of a Selectable Multi-Performance Configuration Architecture

Figure 5:
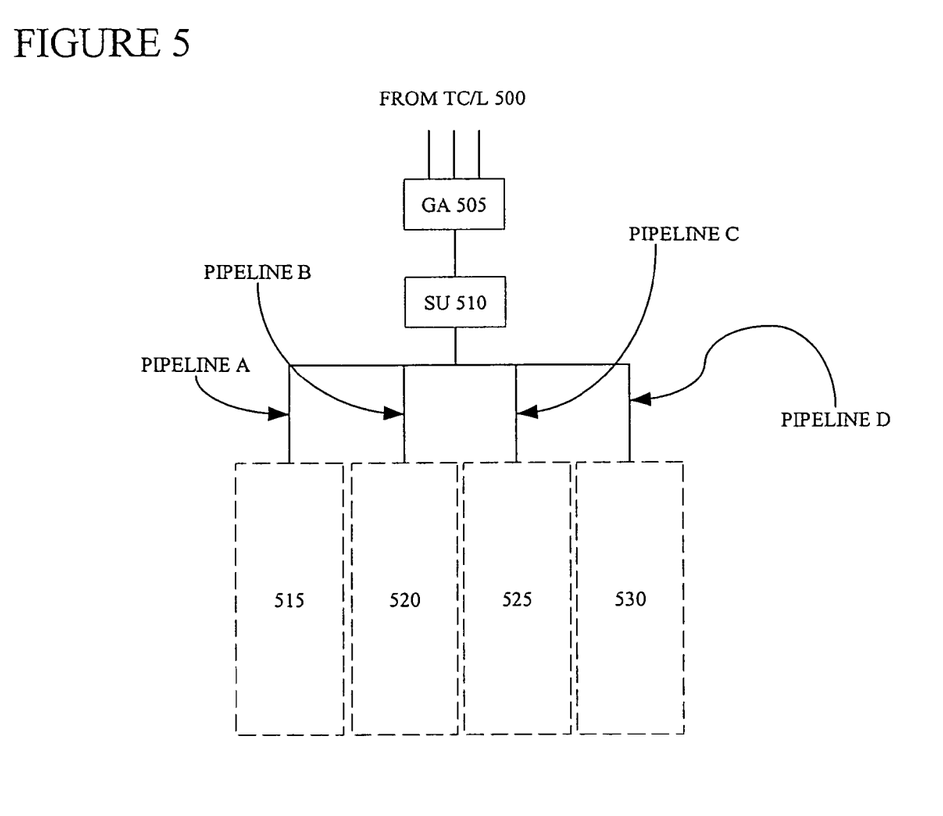
FIG. 5 is a block diagram of a selectable multi-performance configuration according to an embodiment of the present invention.

FIG. 5 is a block diagram of a selectable multi-performance configuration architecture according to another embodiment of the present invention. The overall architecture comprises four pipelines labeled pipeline A–D. Each pipeline is configured to process four pixels per clock with a single texture. Each pipeline owns one-half, one-quarter, or some other fractional proportion of the screen pixels based on a repeating screen pattern (a 16×16 screen tile pattern, for instance). Allocation of work between the pipelines depends on whether a given pipeline is activated or disabled and also on how each graphics primitive intersects the screen tile pattern.

In operation, data is provided by a transform/lighting unit (TC/L) 500. A graphics assembly unit (GA) 505 takes the incoming data and assembles complete graphics primitives (triangles or parallelograms, for instance).

The single stream is passed to a setup unit (SU) 510 which generates slope and initial value information for each of the texture coordinate, color, or Z parameters associated with the primitive. The resulting setup information is then passed to four identical and partitionable pipelines A–D, which transport the pixels to their associated rasterizers 515, 520, 525, or 530. Each of the pipelines owns a logical screen area. For instance, if two pipelines are activated, then they each own one half of the screen pixels. The SU 510 contains logic by which it intersects the graphics primitives with the tile pattern that divides the screen. This is done so that a primitive is only sent to a pipeline if it is likely that it will result in the generation of covered pixels.

Figure 8:
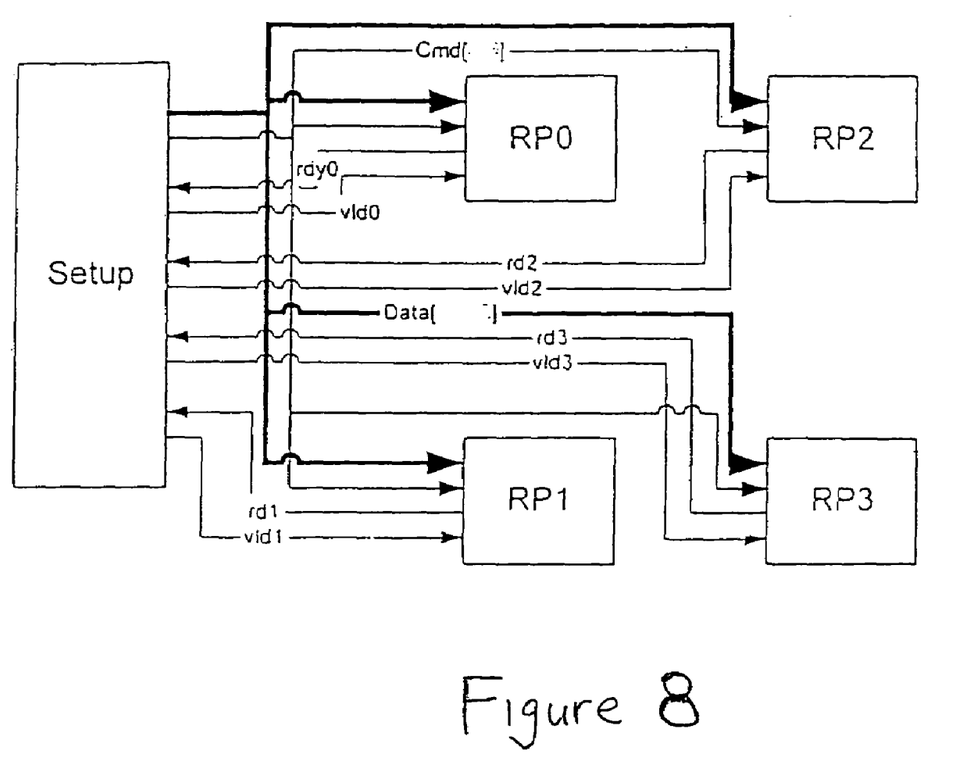
FIG. 8 shows an interface with multiple raster pipes according to an embodiment of the present invention.

One embodiment of an interface with multiple raster pipes is shown in FIG. 8, where setup 1200 communicates with four raster pipes labeled RP0–RP3.

Rasterizer Unit

Figure 6:
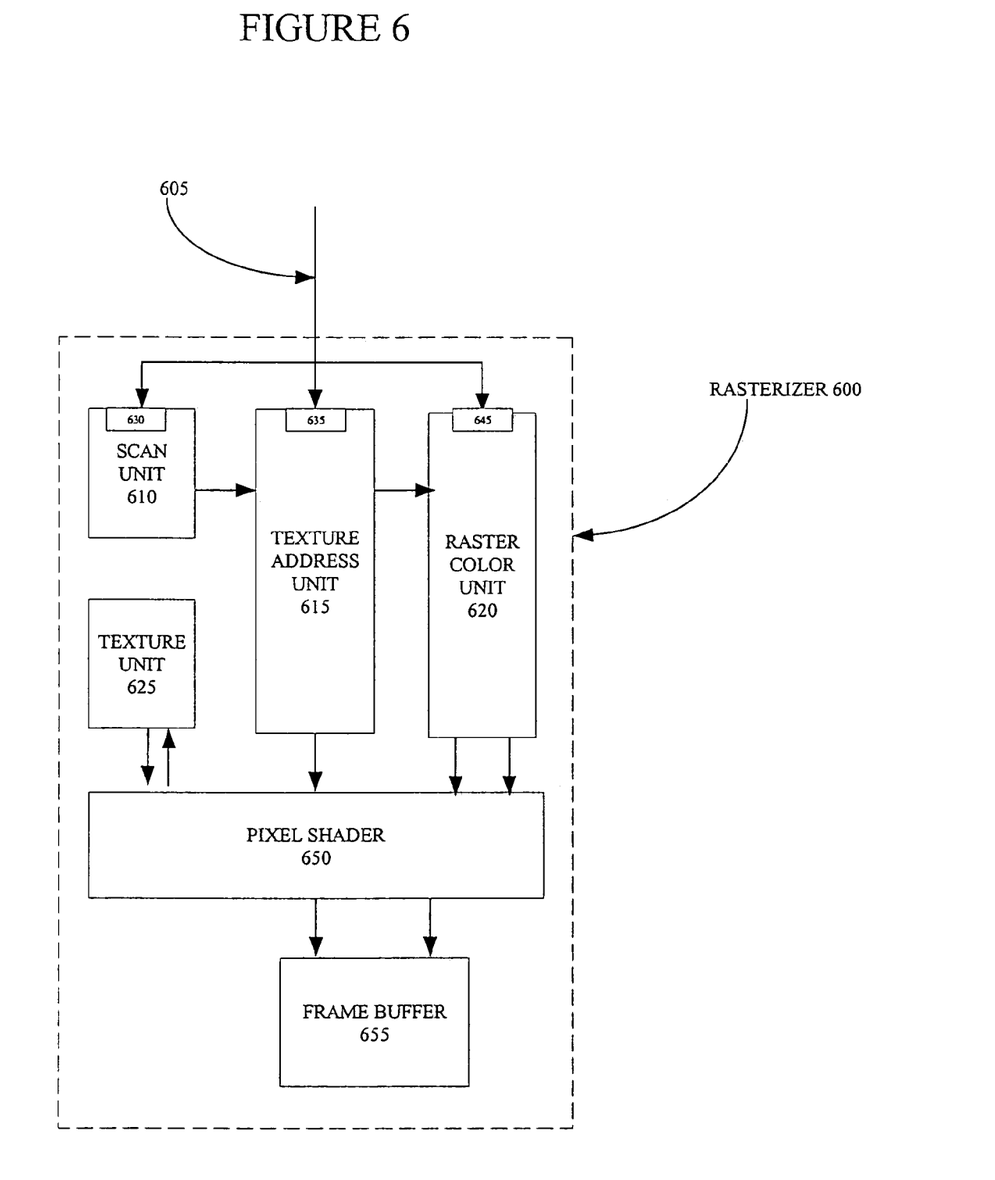
FIG. 6 is a block diagram of a rasterizer according to an embodiment of the present invention.

According to one embodiment of the present invention each pixel is passed through an appropriate pipeline to a rasterizer unit, which may be used as a component of the functional partitions of the present invention. FIG. 6 shows a rasterizer unit according to one embodiment. Data (i.e., pixels) enter the rasterizer 600 via a pipeline 605. The data is then either passed to a scan unit 610, a texture address unit 615, or a raster color unit 620 depending on the format of the incoming data. The texture address unit 615 is coupled to a texture unit 625. Assuming the data is first passed to the scan unit 610, it enters a FIFO 630 where it waits its turn behind other data items that may have arrived first. Once the scan unit performs operations on the pixel, it is passed to the texture address unit 615, which in conjunction with the texture unit 625 performs texturing operations. The texture unit has a FIFO 635, which operates similar to FIFO 630 for orderly processing of data or pixels.

Once complete the texture unit passes the data to raster color unit 640 which performs color operations on the data and uses a FIFO 645. Depending on the operations, some or all of the blocks may be used on any given pixel. Once the units are finished, a pixel shader 650 is used to combine all values to a single value that is to be eventually rendered on the screen. This value is sent to frame buffer 655 where it is processed and handled before it is drawn to the screen.

Embodiment of Computer Execution Environment (Hardware)

Figure 7:
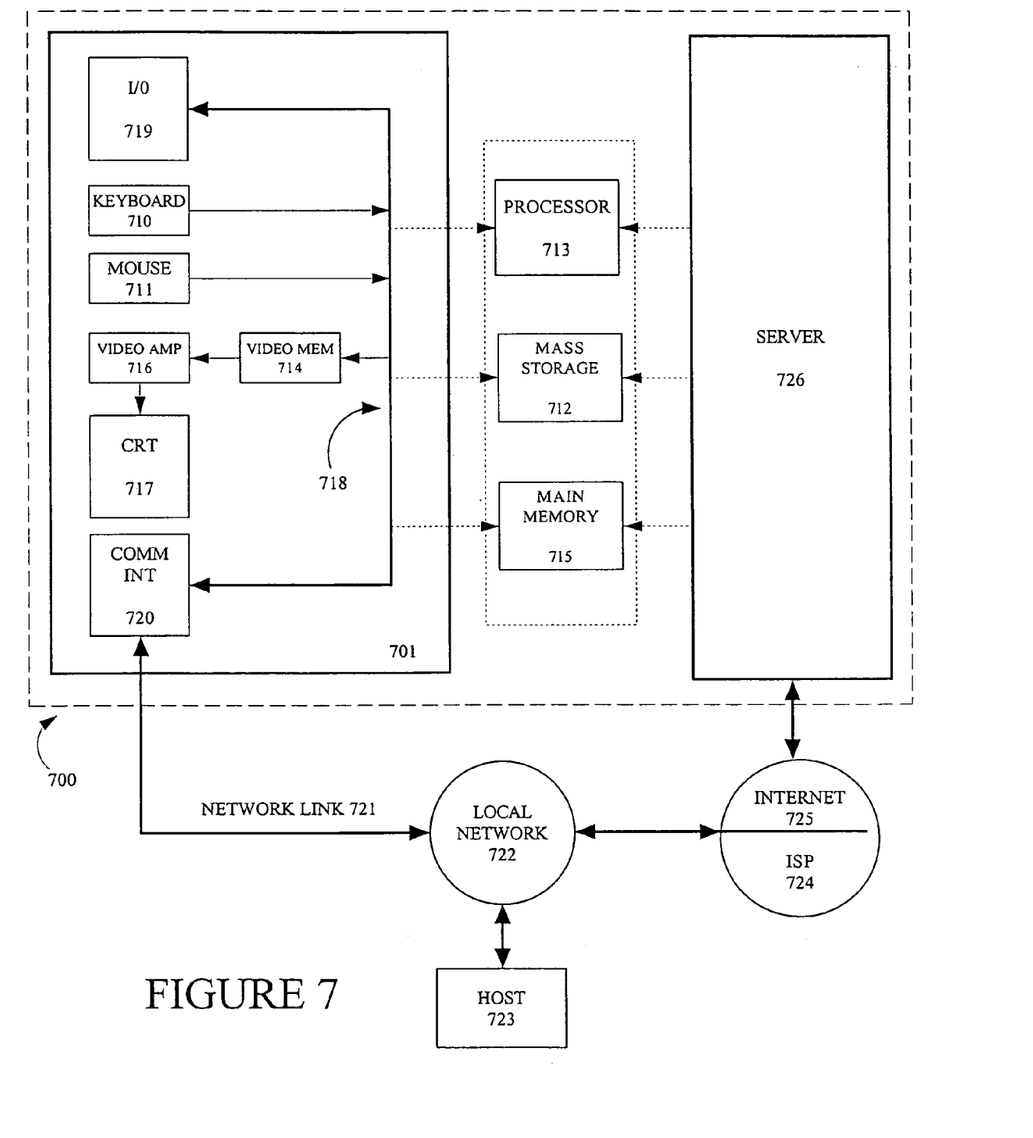
FIG. 7 is an embodiment of a computer execution environment.

An embodiment of the invention can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU) 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to host 723 or to data equipment operated by ISP 724. ISP 724 in turn provides data communication services through the world wide packet data communication network now commonly referred to as the "Internet" 725. Local network 722 and Internet 725 may use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713. As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device and other personal digital assistants, Internet ready cellular phones and other Internet computing devices, and in platform independent computing environments, such as those that utilize the Java technologies also developed by Sun Microsystems, Inc.

The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 may also include, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a microprocessor manufactured by Motorola, such as the 680×0 processor or a microprocessor manufactured by Intel, such as the 80×86, or Pentium processor, or a SPARC microprocessor from Sun Microsystems, Inc. However, any other suitable microprocessor or microcomputer may be utilized. Main memory 715 may be comprised of dynamic random access memory (DRAM). Video memory 714 may be a dual-ported video random access memory. One port of the video memory 714 may be coupled to video amplifier 716. The video amplifier 716 may be used to drive a display/output device 717, such as a cathode ray tube (CRT) raster monitor. Video amplifier 716 is well known in the art and may be implemented by any suitable apparatus. This circuitry converts pixel data stored in video memory 714 to a raster signal suitable for use by display/output device 717. Display/output device 717 may be any type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code may be executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for example only. An embodiment of the invention may be implemented in any type of computer system or programming or processing environment.

The present invention provides a way to produce a single processing product but to sell it for two or more different prices depending on which features are enabled. Thus an entire product range can be supplied with only a single product being manufactured. By selectively disabling certain subsets of features of the processing product, the performance, and ultimately the price, of the processing product can be determined. In some embodiments, a range of features are may each be selectively disabled, so that multiple configurations of performance and price may be achieved. In other embodiments, a single subset of features are selectable disabled as desired to provide two processing product options.

Thus, a selectable multi-performance configuration is described in conjunction with one or more specific embodiments. The invention is defined by the claims and their full scope of equivalents.

The invention claimed is:

1. A graphics processing apparatus comprising:
   an input mechanism;
   a control mechanism configured to receive one or more items of data from said input mechanism;
   a plurality of pipelines configured to receive said items of data as instructed by said control mechanism; and
   a plurality graphics processing units coupled to said pipelines configured to perform one or more computations on said items of data, said plurality of graphics processing units selectably owning a portion of screen area dependent on a number of said plurality of pipelines that are selectably enabled by selectably configuring the control mechanism wherein the screen area owned by any one of the graphics processing units is increased or decreased.

2. The graphics processing apparatus of claim 1 wherein said control mechanism is a mode bit.

3. The graphics processing apparatus of claim 1 wherein said items of data comprise pixels.

4. The graphics processing apparatus of claim 1 wherein said control mechanism is configured to use all of said pipelines, thereby simulating a high-end chip.

5. The graphics processing apparatus of claim 1 wherein said control mechanism is configured to use a subset of said pipelines, thereby simulating a low-end chip.

6. The graphics processing apparatus of claim 1 wherein said graphics processing unit comprises:
   a raster color unit, a texture address unit, and a scan unit coupled to one of said pipelines;
   a pixel shader coupled to said texture address unit and said raster color unit; and
   a frame buffer coupled to said pixel shader, wherein said graphics processing unit is configured to process one or more pixels.

7. A method for selectably configuring a graphics processing apparatus comprising:
   using an input mechanism to provide one or more items of data to one or more of a plurality of pipelines disposed in said graphics processing apparatus;
   routing said items of data to some or all of said pipelines with a control mechanism; and
   operating on said items of data in one or more of a plurality of graphics processing units coupled to said pipelines;
   selectably assigning a portion of screen ownership to each of said graphics processing units dependent on a number of selectable enabled graphics processing units by selectable configuring the control mechanism wherein the screen area owned by any one of the graphics processing units is increased or decreased.

8. The method of claim 7 wherein said control mechanism is a mode bit.

9. The method of claim 7 wherein said items of data comprise pixels.

10. The method of claim 7 wherein said control mechanism is configured to use all of said pipelines, thereby simulating a high-end chip.

11. The method of claim 7 wherein said control mechanism is configured to use a subset of said pipelines, thereby simulating a low-end chip.

12. The method of claim 7 wherein said graphics processing unit comprises:
a raster color unit, a texture address unit, and a scan unit coupled to one of said pipelines;
a pixel shader coupled to said texture address unit and said raster color unit; and
a frame buffer coupled to said pixel shader, wherein said graphics processing unit is configured to process one or more pixels.

13. A computer program product comprising:
a computer usable medium having computer readable program code embodied therein configured to selectably configure a graphics processing apparatus, said computer program product comprising:
computer readable code configured to cause a computer to use an input mechanism to provide one or more items of data to one or more of a plurality of pipelines disposed in said graphics processing apparatus;
computer readable code configured to cause a computer to route said items of data to some or all of said pipelines with a control mechanism; and
computer readable code configured to cause a computer to operate on said items of data in one or more of a plurality of graphics processing units coupled to said pipelines;
computer readable code configured to cause a computer to selectably assign a portion of screen ownership to each graphics processing unit depending on a number of selectably enabled graphics processing units by selectably configuring the control mechanism wherein the screen area owned by any one of the graphics processing units is increased or decreased.

14. The computer program product of claim 13 wherein said control mechanism is a mode bit.

15. The computer program product of claim 13 wherein said items of data comprise pixels.

16. The computer program product of claim 13 wherein said control mechanism is configured to use all of said pipelines, thereby simulating a high-end chip.

17. The computer program product method of claim 13 wherein said control mechanism is configured to use a subset of said pipelines, thereby simulating a low-end chip.

18. The computer program product of claim 13 wherein said graphics processing unit comprises:
a raster color unit, a texture address unit, and a scan unit coupled to one of said pipelines;
a pixel shader coupled to said texture address unit and said raster color unit; and
a frame buffer coupled to said pixel shader, wherein said graphics processing unit is configured to process one or more pixels.

19. A method of producing a processing apparatus comprising:
producing a processing apparatus having a full set of features;
including in said processing apparatus a mechanism for disabling a subset of said full set of features and selectably assigning screen ownership based on the state of enablement of said features by selectably configuring the mechanism wherein the screen ownership is increased or decreased.

20. The method of claim 19 wherein a processing apparatus having said full set of features enabled is distributed for a first price and a processing apparatus having said subset of said full set of features disabled is distributed for a second price.

21. The method of claim 20 wherein said first price is higher than said second price.

22. The method of claim 19 wherein said mechanism permanently disables said subset of said full set of features.

23. The method of claim 19 further including a plurality of mechanisms for disabling a plurality of subsets of features of said full set of features.

* * * * *

UNITED STATES PATENT AND TRADEMARK OFFICE
CERTIFICATE OF CORRECTION

PATENT NO. : 7,075,542 B1
APPLICATION NO. : 10/731752
DATED : July 11, 2006
INVENTOR(S) : Mark M. Leather

It is certified that error appears in the above-identified patent and that said Letters Patent is hereby corrected as shown below:

Col. 8, line 62, delete "selectable" and insert --selectably--.

Col. 8, line 63, delete "selectable" and insert --selectably--.

Signed and Sealed this

Thirty-first Day of October, 2006

JON W. DUDAS
*Director of the United States Patent and Trademark Office*